No. 738,591. PATENTED SEPT. 8, 1903.
E. B. ALLEN.
BUTTONHOLE STITCHING MACHINE.
APPLICATION FILED SEPT. 20, 1901.
NO MODEL. 10 SHEETS—SHEET 1.

Witnesses:
Inventor:
Edward B. Allen,

No. 738,591. PATENTED SEPT. 8, 1903.
E. B. ALLEN.
BUTTONHOLE STITCHING MACHINE.
APPLICATION FILED SEPT. 20, 1901.
NO MODEL. 10 SHEETS—SHEET 3.

Witnesses:
Inventor:
Edward B. Allen

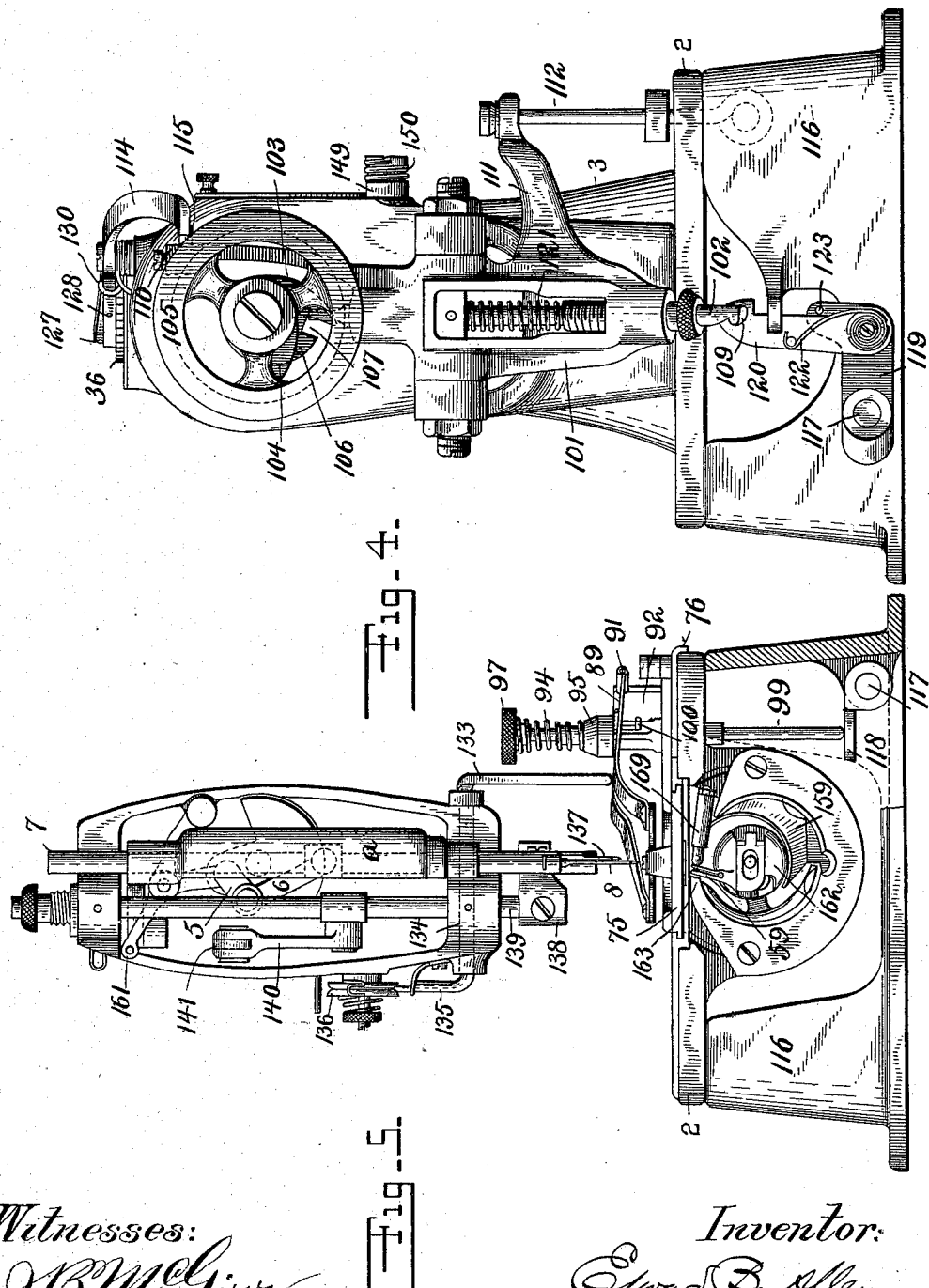

No. 738,591. PATENTED SEPT. 8, 1903.
E. B. ALLEN.
BUTTONHOLE STITCHING MACHINE.
APPLICATION FILED SEPT. 20, 1901.
NO MODEL. 10 SHEETS—SHEET 5.
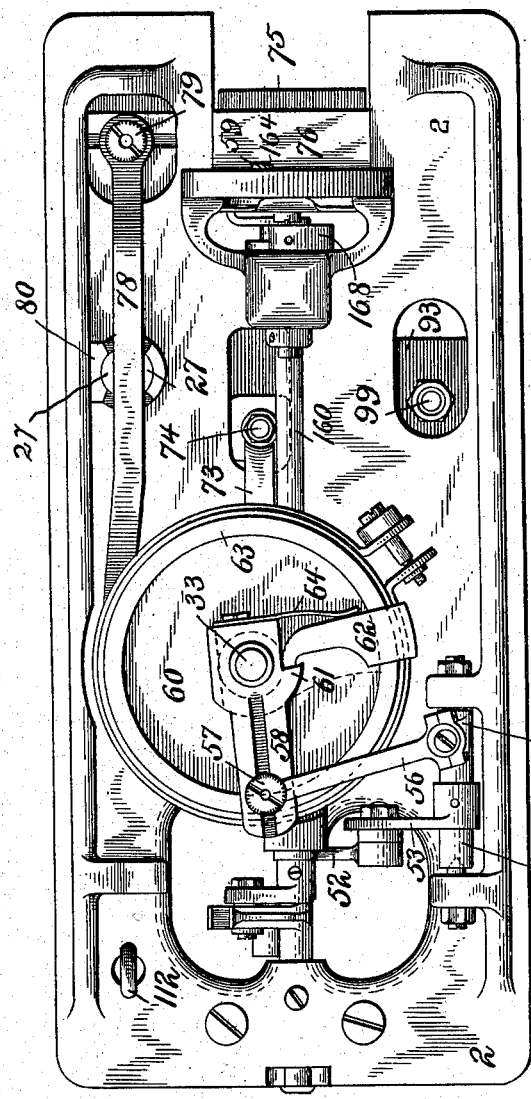
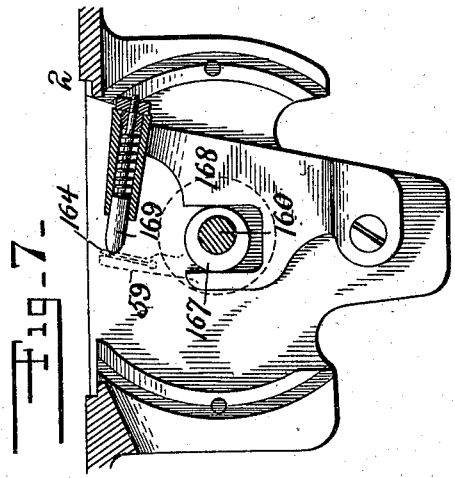
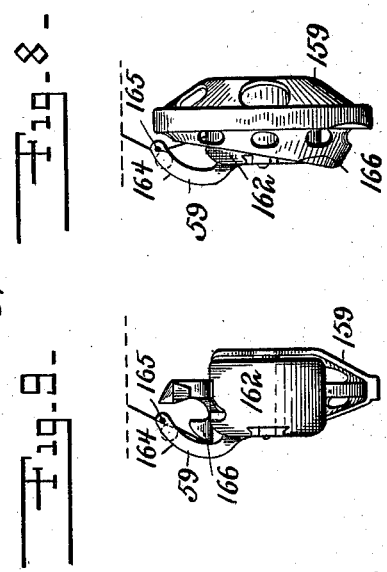
Witnesses:
Inventor:

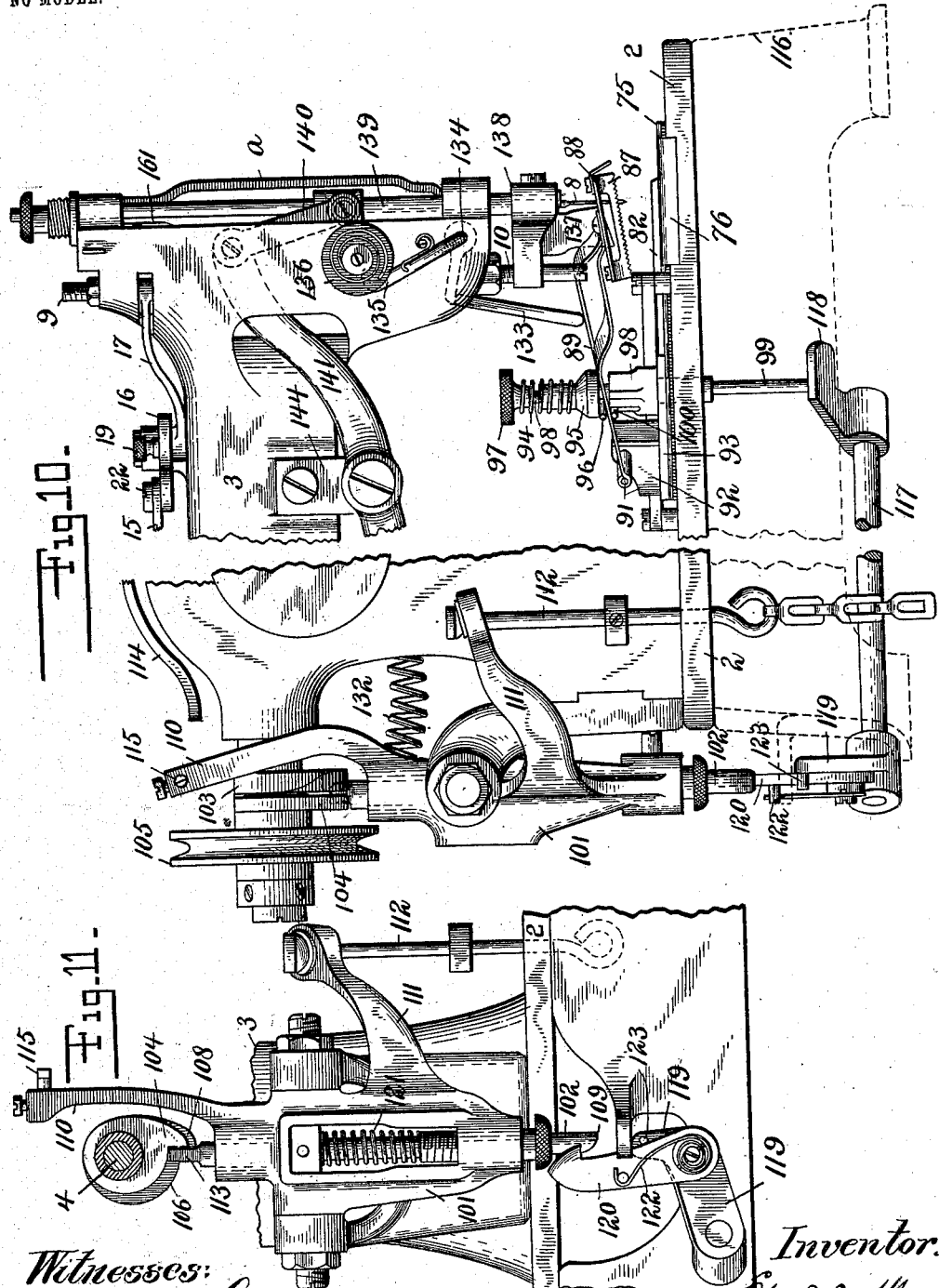

No. 738,591. PATENTED SEPT. 8, 1903.
E. B. ALLEN.
BUTTONHOLE STITCHING MACHINE.
APPLICATION FILED SEPT. 20, 1901.
NO MODEL. 10 SHEETS—SHEET 7.
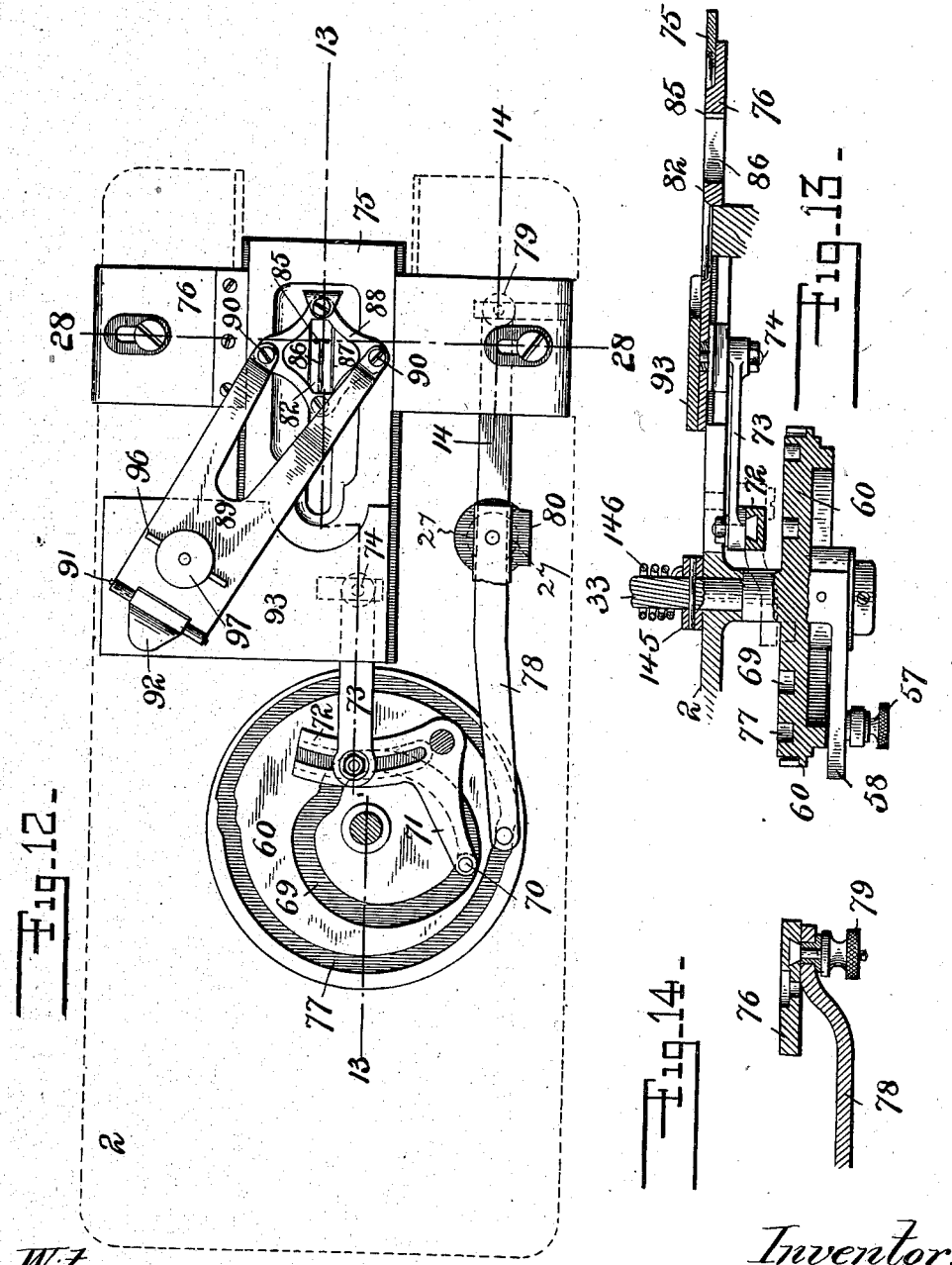
Witnesses:
J. B. McGirr.
C. M. Sweeney.
Inventor:
Edward B. Allen
by Henry Calver Jr.
Atty.

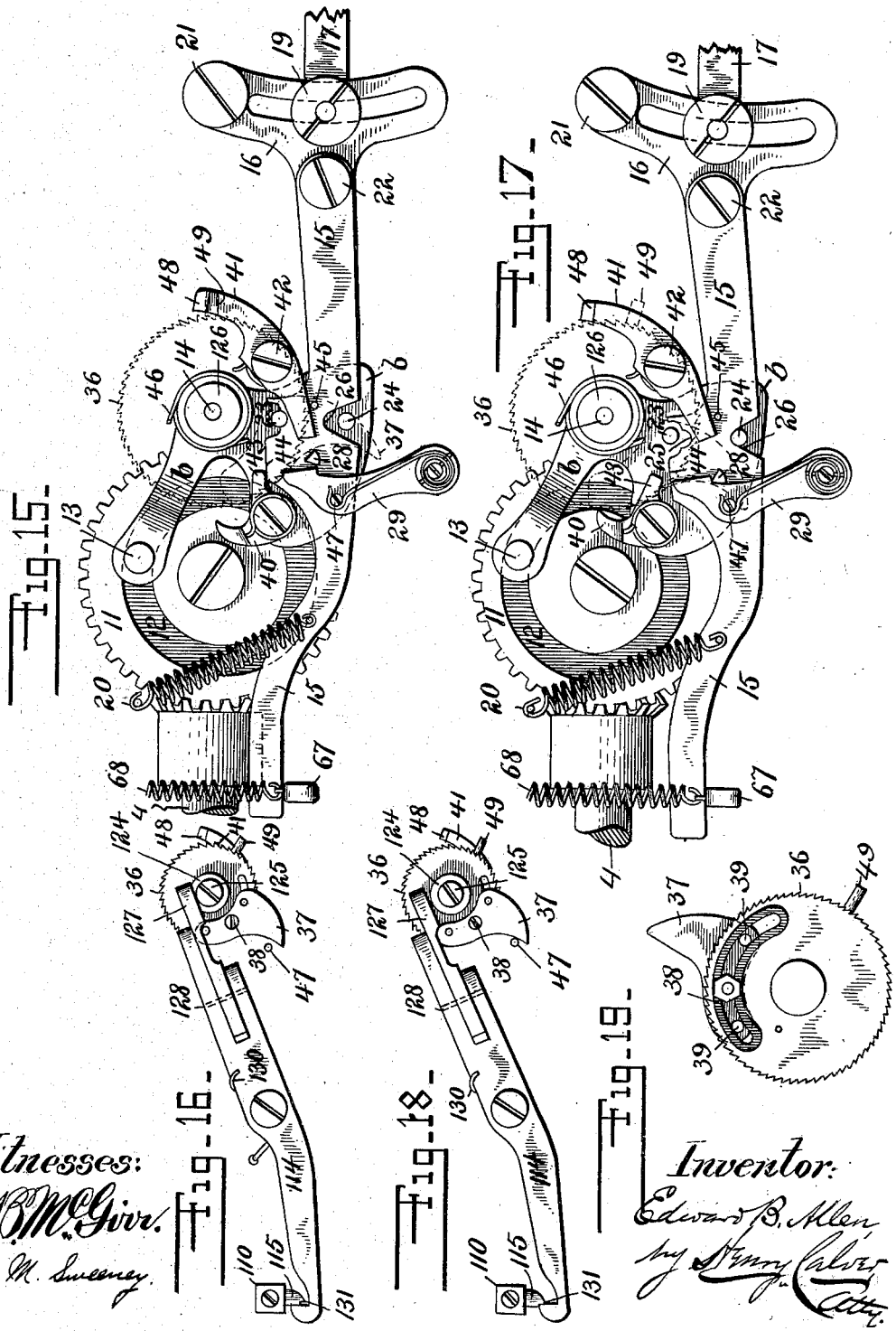

No. 738,591. PATENTED SEPT. 8, 1903.
E. B. ALLEN.
BUTTONHOLE STITCHING MACHINE.
APPLICATION FILED SEPT. 20, 1901.
NO MODEL. 10 SHEETS—SHEET 9.
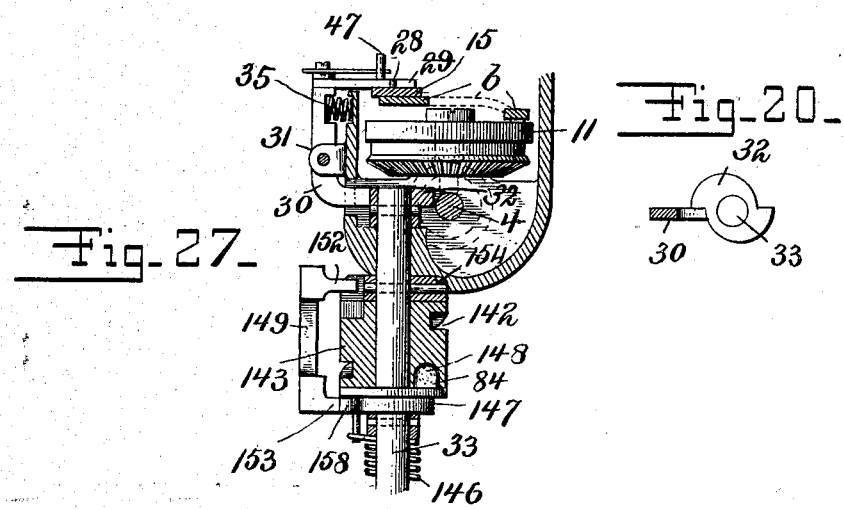
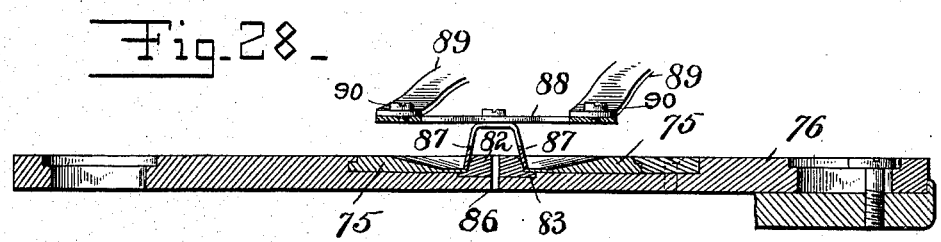
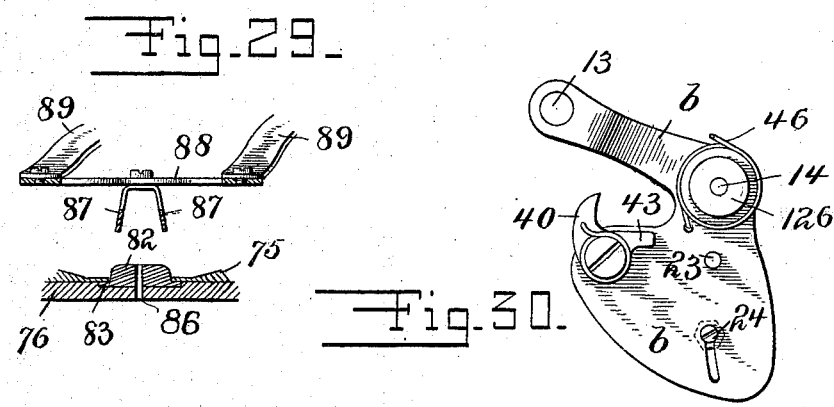
Witnesses:
Inventor:

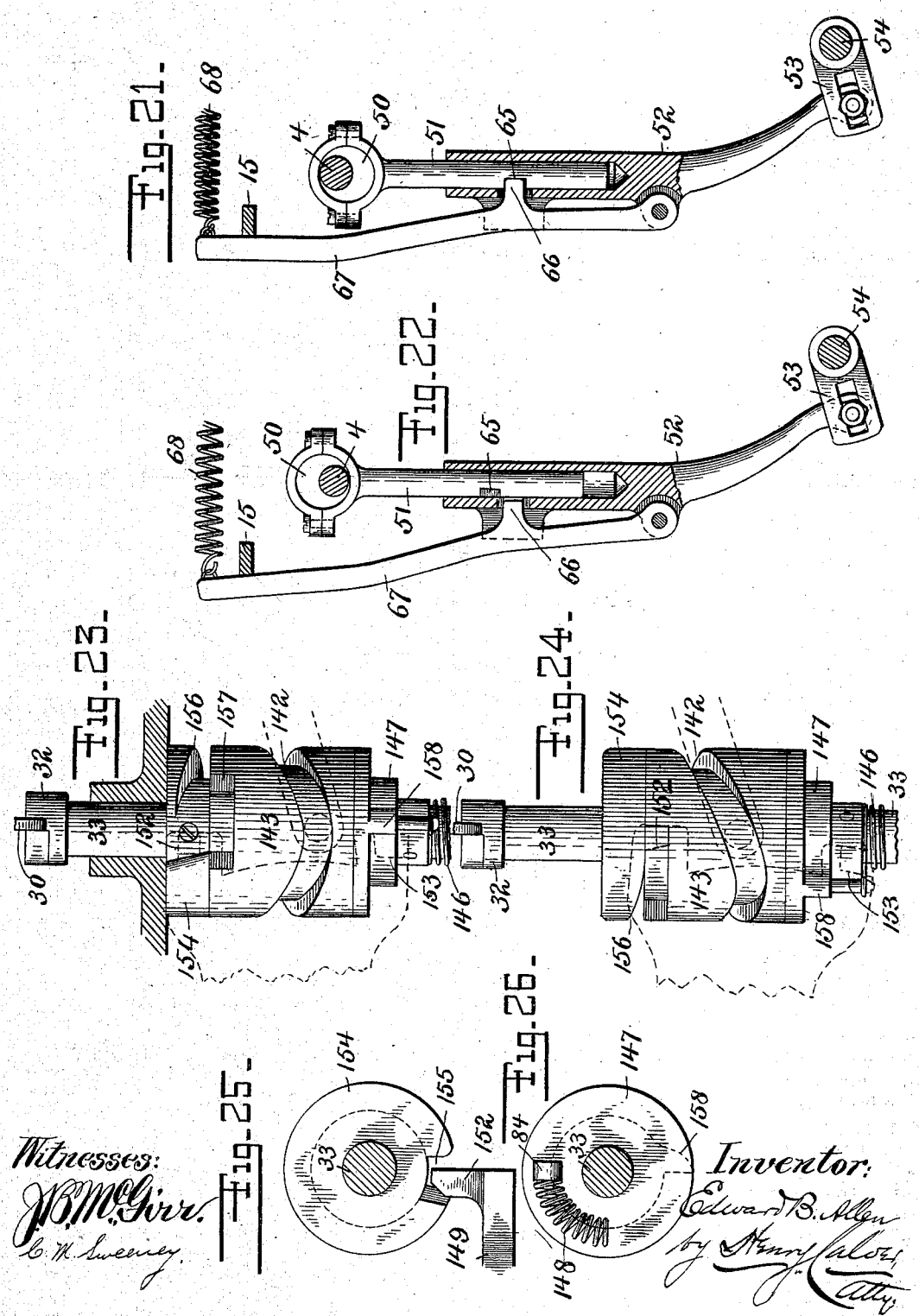

No. 738,591. Patented September 8, 1903.

UNITED STATES PATENT OFFICE.

EDWARD B. ALLEN, OF ELIZABETH, NEW JERSEY, ASSIGNOR TO THE SINGER MANUFACTURING COMPANY, A CORPORATION OF NEW JERSEY.

BUTTONHOLE-STITCHING MACHINE.

SPECIFICATION forming part of Letters Patent No. 738,591, dated September 8, 1903.

Application filed September 20, 1901. Serial No. 75,667. (No model.)

*To all whom it may concern:*

Be it known that I, EDWARD B. ALLEN, a citizen of the United States, residing at Elizabeth, in the county of Union and State of New Jersey, have invented certain new and useful Improvements in Buttonhole-Stitching Machines, of which the following is a specification, reference being had therein to the accompanying drawings.

This invention relates more particularly to that class of buttonhole-stitching machines for working and barring so-called "straight" buttonholes, in contradistinction to "eyed" buttonholes, although some features of the invention are applicable to machines for working and barring eyed buttonholes.

The invention has for its object to provide an automatic buttonhole-machine which is efficient in operation and comparatively simple in construction, which is adapted to work and bar buttonholes of different lengths and to automatically cut the same, which is capable of adjustment to vary the depths of the overseaming or edge-covering stitches by varying the horizontal movements of the needle-bar and to vary the distances apart of the same by a variation of the feed of the work-clamp, as also to provide a machine in the operation of which any desired number of barring-stitches may be formed regardless of the speed of the feed or the distance apart of the overseaming or edge-covering stitches.

Figure 1:
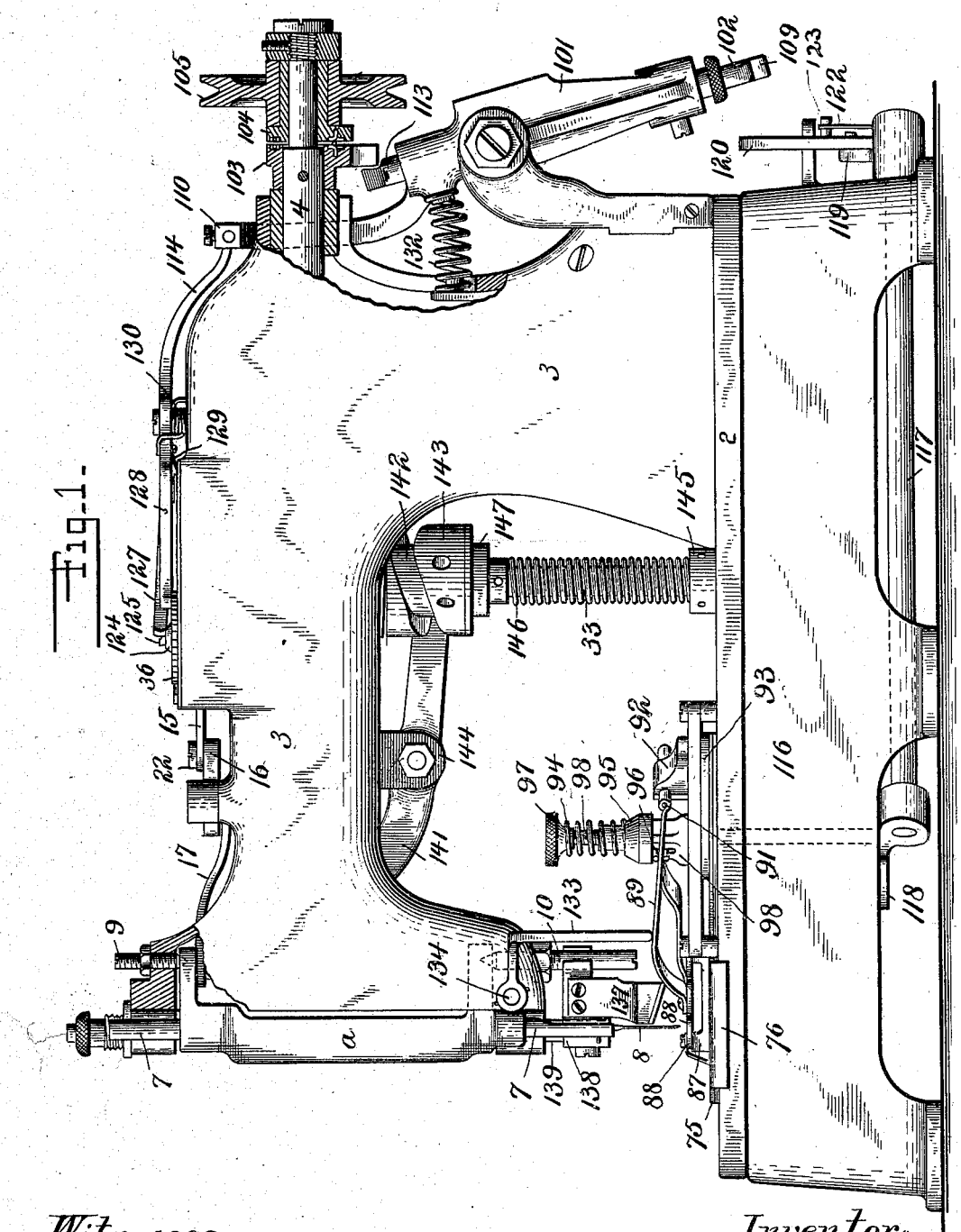
Figure 2:
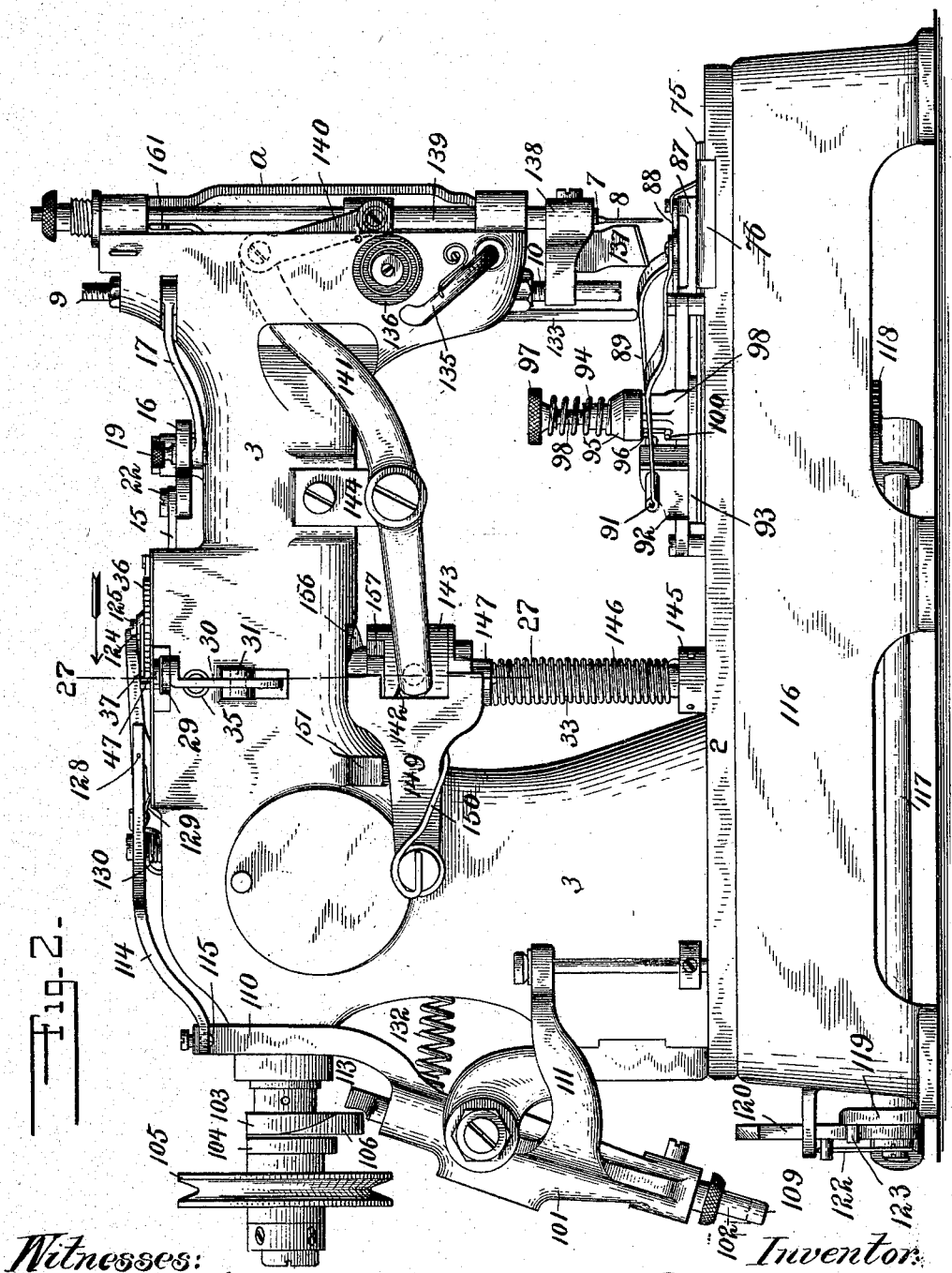
Figure 3:
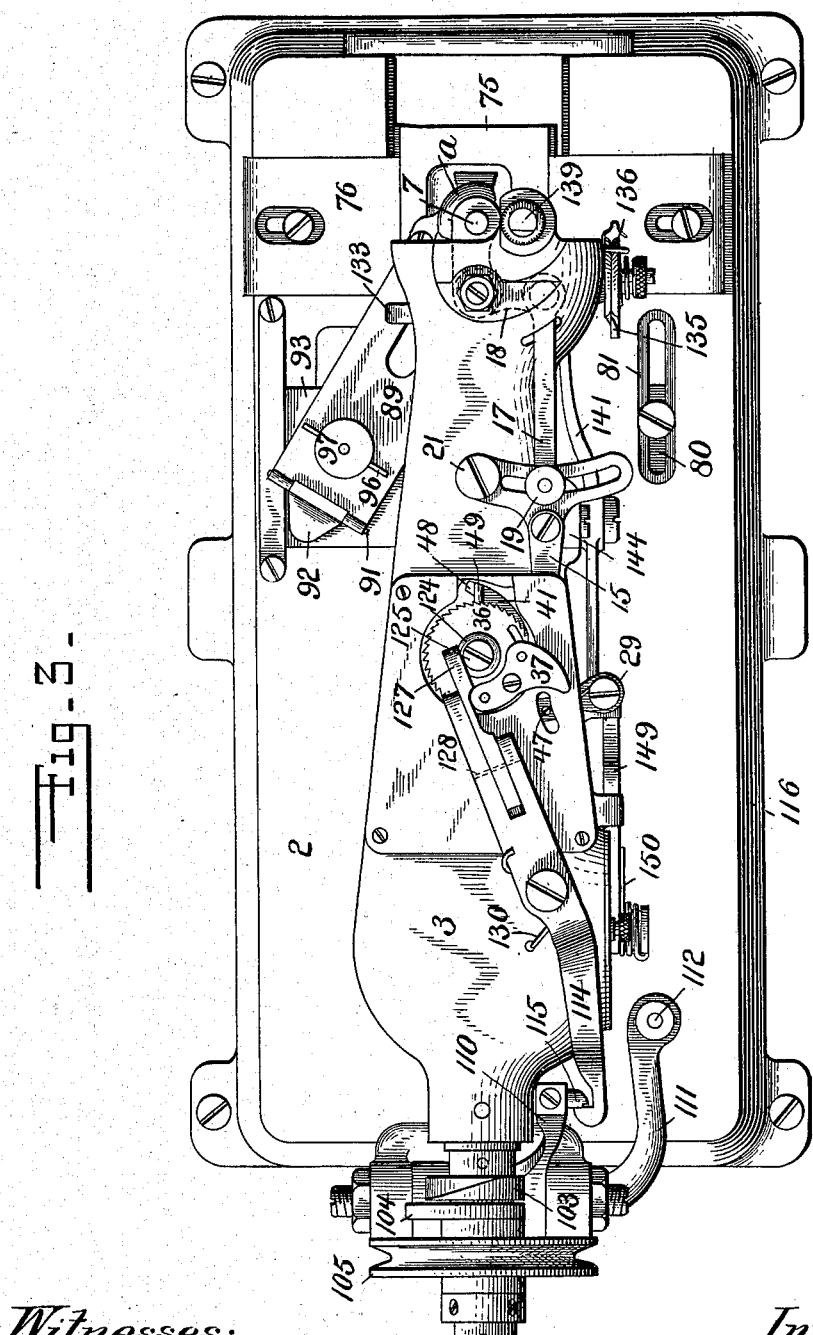

In the accompanying drawings, Figures 1 and 2 are opposite side views of a machine embodying the invention with portions of the frame of the machine broken away to show parts of the mechanism. Fig. 3 is a top plan view of the machine. Fig. 4 is a rear end view of the machine, and Fig. 5 is a front end view thereof. Fig. 6 is a bottom view of the machine. Fig. 7 is a detail view to show the thread-nipping mechanism. Figs. 8 and 9 are detail views of the shuttle and bobbin with which the thread-nipping device coöperates. Fig. 10 is a broken-out rear side view of the machine with the parts in the positions they assume when the machine is automatically stopped, and Fig. 11 is a partial rear end view of the machine with the parts in the same positions as in Fig. 10. Fig. 12 is a plan view to show the work-clamp and its feeding and shifting mechanism. Fig. 13 is a section on line 13 13, Fig. 12. Fig. 14 is a detail section on line 14 14, Fig. 12. Figs. 15, 16, 17, 18, 19, and 20 are detail views illustrative of the mechanism for shifting the needle horizontally in stitching and barring. Figs. 21 and 22 are detail views of a part of the feed-operating mechanism. Figs. 23, 24, 25, and 26 are detail views of a part of the cutter-operating mechanism. Fig. 27 is a sectional elevation on line 27 27, Fig. 2. Fig. 28 is a section on line 28 28, Fig. 12, with clamp closed. Fig. 29 is a detail section on same line with clamp open. Fig. 30 is a detail view of the preferred form of the lever or rocker coöperating with the needle-shifting mechanism.

Referring to the drawings, 2 denotes the work-plate, and 3 the arm, of the machine. The driving-shaft 4 is journaled in the upper part of the said arm and has at its forward end a crank 5, connected by a pitman 6 with the needle-bar 7 to impart vertical reciprocations to said bar and to the needle 8, carried thereby, this being an old and well-known needle-operating mechanism. The needle-bar reciprocates vertically in a horizontally-swinging frame or gate $a$, mounted on vertical pivots 9 10, the horizontal movements of said needle-bar and needle being for the purpose of forming the overseaming and barring stitches without reciprocating the work horizontally. The horizontal movements of the needle-bar frame are derived from a cam-wheel 11, geared to the driving or needle-bar shaft 4, so as to rotate once to each two rotations of said shaft. The cam-wheel 11 is provided with a cam-grove 12, entered by a pin or stud 13 on an arm of a lever or rocker $b$, having its fulcrum or center of motion at 14, and which lever or rocker is connected, through a bar 15, swinging arm 16, and link 17, with an arm 18 of the said needle-bar frame.

To provide for a variation of the horizontal throw of the needle-bar frame for the purpose of varying the depths of the overseaming-stitches, the swinging arm or lever 16 is slotted and the link 17 is adjustably connected with said arm by a screw 19, the position of which may be varied in said slotted arm to make the connection of said link with said arm nearer to or farther from the screw-stud 21, on which said arm is pivoted.

In forming the barring-stitches at both ends of each buttonhole it is necessary, or at least desirable, to increase the horizontal throw of the needle-bar frame, and the means by which this is automatically effected at the proper times and in proper proportions to the horizontal throw of the needle-bar frame will now be described.

The bar 15 is pivotally connected at its forward end to the swinging arm 16 by a screw 22, so as to permit said bar to be moved laterally when desired. The lever or rocker $b$ is provided with two pins 23 and 24, the latter being preferably about twice as far as the former from the fulcrum or center of motion of said lever or rocker. The bar 15 is provided with two notches 25 and 26, having converging walls, and the narrow parts of either of which notches may be brought into operative engagement with its respective coöperating pin by a sidewise movement of the said bar. Thus when the said bar 15 is in such position (see Fig. 15) that the pin 23 is in the narrow part of the notch 25 such longitudinal movements will be imparted to the said bar as are required in the formation of the overseaming-stitches of the buttonholes; but when the said bar is moved laterally to cause the walls of the narrow part of the notch 26 to embrace the pin 24 (see Fig. 16) the longitudinal movements of the said bar 15, and consequently the horizontal movements of the needle-bar frame, will be increased, as is desirable during the times when the barring-stitches are being formed. When either of the pins 23 or 24 is in operative engagement with the said bar 15 by being embraced by the walls of the narrow part of its appropriate converging notch, the wider portion of the other converging notch affords a proper clearance for the other pin, and it will thus be understood that when one of the said pins is in engagement with said bar the other of said pins is disengaged therefrom.

It is customary in barring straight buttonholes to make the barring-stitches of twice the length of the overseaming-stitches, so that the said barring-stitches extend from outside to outside of the two rows of overseaming-stitches, and to this end the pin 24 is shown in Figs. 15 and 16 as being twice as far as the pin 23 from the fulcrum of the lever or rocker $b$; but as it is desirable in some classes of work to make the barring-stitches more than twice the length of the overseaming-stitches the pin 24 will preferably be made adjustable, as shown in Fig. 30, so that barring-stitches of any desired length may be made; but whether the pin 24 be adjustable on the lever or rocker $b$ or not the horizontal throw of the needle-bar and needle will always be proportionately increased for the barring-stitches, owing to the fact that said pin is farther from the fulcrum or center of motion of the said vibrating lever or rocker than the pin 23, from which the horizontal movements of the needle-bar and needle are derived, and which lever or rocker carries both of these pins. I do not, however, in this application claim, broadly, the feature just referred to and consisting of the combination, in a buttonhole-stitching machine, of a stitch-forming mechanism comprising a horizontally-movable needle-bar and needle, means for increasing or diminishing the horizontal throw of the needle-bar and needle for varying the width of the overseam, and a barring mechanism comprising means for automatically increasing the horizontal throw of the needle-bar and needle for the barring operations, so that whatever may be the normal horizontal throw of the needle-bar and needle for the overseaming-stitches the horizontal throw of the needle-bar and needle for the barring-stitches will be proportionally larger, as this feature is embraced by my application, Serial No. 116,864, filed July 24, 1902. The bar 15 is normally held by a spring 20 in such position that the narrow part of the notch 25 will embrace the pin 23, so that the parts will be in overseaming positions, and the said bar is at the proper times automatically shifted to barring position. To this end the bar 15 is provided with a pin 28, arranged to be engaged by a spring-pressed pawl 29, pivoted to the top of the upper or vertical arm of a bell-crank lever 30, fulcrumed in a stud or bracket 31 on the arm 3, the lower or horizontal arm of said lever being held by a stiff spring 35 in peripheral contact with a cam 32, carried by a vertical shaft 33, to the lower end of which, beneath the work-plate, the feed-wheel 60 is rigidly fixed, so that said shaft rotates with said feed-wheel. The said feed-wheel serves, as will be hereinafter described, to impart the proper longitudinal feeding or stitch-spacing movements to the work-clamp, as well as the lateral shifting movements thereof necessary to bring the second side of a buttonhole beneath the needle after the first side of such buttonhole has been stitched. Thus by the time the stitching of the first side of a buttonhole has been completed the cam 32 has caused the pawl 29 to move inward, so that its hook will engage the pin 28 on the bar 15, and when a full portion of said cam passes by the lower arm of the lever 30 the stiff spring 35, more powerful than the spring 20, quickly forces the lower arm of the said lever inward, and thus through the pawl 29 and pin 28 moves the bar 15 outward into engagement with the pin 24 and out of engagement with the pin 23, thereby increasing the throw of the needle-bar frame to form the barring-stitches. The cam 32 is a double one, and during the stitching of a side of a buttonhole the lever 30 is gradually moved by said cam to cause the return movements of the pawl 29, so that it can again engage the pin 28 in readiness for a barring operation which is to occur after each side of a buttonhole has been stitched, so as to bar both ends of such buttonhole. During the formation of barring-stitches the feed of the clamp is suspended by automatically suspending the movements of the feed-wheel, as will be hereinafter described. The number of stitches for each bar is governed through the instrumentality of a ratchet-wheel 36, provided with a controlling-plate 37, adjustably secured to said ratchet-wheel in a well-kown manner by means of a set-screw and nut entering a segmental slot 38, with which said wheel is provided. Said plate is preferably furnished with steadying dowel-pins 39, also entering said slot. The ratchet-wheel 36 is given intermittent forward rotary movements during the barring operations by a spring-pressed operating-pawl 40, mounted on the lever or rocker b, and said wheel is at such times held from backward rotation by a spring-pressed detent-pawl 41, pivoted on a screw or stud 42, fixed to the bracket-arm 3. The operating-pawl 40 is provided with a tripping-arm 43, arranged to be engaged by a lug or projection 44 on the bar 15, and said bar 15 is also provided with a tripping-pin 45 to engage the tail of the detent-pawl 41. When the bar 15 is shifted laterally to barring position, (see Fig. 17,) the operating and detent pawls 40 41 are both in engagement with the ratchet-wheel 36; but when said bar 15 is shifted from barring position to stitching position the lug 44 on said bar, through the tripping-arm 43 on the operating-pawl 40, moves said pawl out of engagement with the said ratchet-wheel, and the detent-pawl 41 is simultaneously disengaged from said ratchet-wheel by the tripping-pin 45, leaving the said wheel free to be returned to its normal or starting position by a torsional coil-spring 46, connected to a stationary part and to said ratchet-wheel.

From the foregoing it will be understood that when the bar 15 is shifted from stitching position to barring position by the pawl or hook 29 on the lever 30 the pawls 40 and 41 will cause an intermittent forward movement to be imparted to the ratchet-wheel 36 until the controlling-plate 37, by engaging a pin 47 on the pawl or hook 29, disengages said hook or pawl from the pin 28 on the bar 15 and leaves said bar free to be shifted from barring position to stitching position by the spring 20, such shifting of the bar 15 disengaging the pawls 40 and 41 from said ratchet-wheel, as has been described. The number of barring-stitches (usually about three or four) to be formed during the forward movement of the ratchet-wheel 36 will depend on the position of adjustment of the controlling-plate 37 on said wheel, as has been stated, for the reason that said ratchet-wheel always starts forward from the same initial position governed by an upward projection 48, forming part of the detent-pawl 41 and arranged to be engaged by a stop-pin 49 on said ratchet-wheel, these parts limiting the return movements of said ratchet-wheel by the spring 46. Thus by adjusting the controlling-plate 37 on said ratchet-wheel, so that said plate will disengage the pawl or hook 29 from the pin 47 earlier or later in the forward movements of the ratchet-wheel, a smaller or greater number of barring-stitches may be formed, as may be desired.

The feeding mechanism for the work-clamp will next be described.

The driving-shaft 4 is provided near its rear end with an eccentric 50, embraced by a strap or yoke at the upper end of a rod 51, extending into a socket formed for its reception in the upper part of a rod or bar 52, having a jointed connection at its lower end with a horizontally-extending slotted arm 53 of a rock-shaft 54, provided with a depending arm 55, with which one end of a pitman 56 has a ball-and-socket joint. The other end of the said pitman 56 is adjustably connected by a set-screw 57 with a slotted swinging arm 58, pivoted on the vertical shaft 33, to which the feed-wheel 60 is secured. The arm 58 has a projection 61 arranged to engage the inner end of a clutch-dog 62, the outer end of which is slotted to embrace a circular rib or flange 63 on the lower face of the feed-wheel 60, and which clutch-dog in coöperation with the vibrating projection 61 and a spring 64 serves to impart an intermittent or step-by-step rotary movement to said feed-wheel. It is desirable that during the barring operation the feed of the work-clamp should be suspended, so as to pile the barring-stitches on top of each other or to put them all in one place, and it is to this end that the feed-operating connecting-rod is formed in two disconnectible parts 51 52. The rod or part 51 is provided with a notch 65, to be entered by a pin or lug 66 on a lever 67, pivoted to the rod or part 52, said pin or lug 66 being normally held in said notch 65 by a spring 68, acting on said lever 67 to couple the two parts of the connecting-rod together. When the bar 15 is shifted laterally to barring position, as has been described, it engages the lever 67 at its upper end, and thus withdraws the pin or lug 66 from the notch in the rod 51, leaving said rod free to reciprocate idly in its socket in the upper part of the rod 52, and thereby suspending the rotary feeding or stitch-spacing movements of the feed-wheel 60. When the bar 15 is shifted from barring position to stitching position by the mechanism heretofore described, the spring 68 restores the lever 67 to its normal position to couple the two parts of the feed-operating connecting-rod together. The feed may be varied or regulated either by varying the position of connection of the pitman 56 with the swinging arm or lever 58 or by varying the position of connection of the rod 52 with the slotted arm 53 of the rock-shaft 54, or by utilizing both of these adjustments.

From the foregoing it will be apparent that the barring mechanism of this improved machine is quite independent of the clamp-feeding mechanism thereof, thus avoiding an objection existing in straight buttonhole machines or attachments heretofore generally in use and in which the barring mechanisms were not independent of the feeding mechanisms or in which the feed of the work-clamp was not suspended during the barring operation, so that when the feed was lengthened to space the overseaming or covering stitches farther apart the number of barring-stitches was lessened to the detriment of the work.

The feed-wheel 60 is provided in its upper face with a cam-groove 69, entered by a pin or roller-stud 70 on an arm 71 of a clamp-feeding lever pivoted to the work-plate 2 and having a second curved and slotted arm 72, to which one end of a link or pitman 73 is adjustably secured, the other end of said link or pitman being attached to a pin or stud 74, depending from or connected with the work-clamp base-plate 75, which slides longitudinally in a transverse plate 76, mounted for a limited lateral sliding movement on the machine work-plate 2. The lever 71 72 serves to impart longitudinal feeding movements to the work-clamp to space the overseaming or covering stitches, as will be understood, and the longitudinal throw of the work-clamp to determine the length of a buttonhole is regulated or varied by varying the position of adjustment of the connection of the link or pitman 73 in the slotted arm 72 of the clamp-feeding lever. The lateral or shifting movements of the clamp to bring the two opposite sides of a buttonhole beneath the needle are derived from a cam-groove 77 in the feed-wheel 60 through a shifting-lever 78, having at its rear end a pin or roller-stud entering said cam-groove and preferably having at its forward end an adjustable connection (shown in detail in Fig. 14) with the transverse plate or slide 76 by means of a set-screw 79, entering a slot in said plate or slide. The shifting-lever 78 swings on an adjustable fulcrum consisting of a block 80, having cheek-pieces 27 embracing said lever, said block being adjustably secured in a slot 81 in the work-plate 2. By adjusting the fulcrum-block 80 the lateral shifting movements or lateral throw of the plate or slide 76 may be varied, and by varying the position of the adjustable connection of the forward end of the lever 78 with the plate or slide 76 the working position of said plate may be adjusted or regulated.

The plate 76 is provided with a raised throat plate or portion 82, preferably formed on a separate plate 83, properly secured to said plate 76, but conveniently removable, so that it may be replaced by another similar plate. The raised portion 82 of the throat-plate has a transverse slot 85 for the reception of the needle and a longitudinal slot 86 for the reception of the buttonhole cutter or cutting knife. The sides of the raised portion 82 of the throat-plate are preferably rounded or chamfered off, so as to be slightly outwardly sloping. The upper portion or member of the work-clamp preferably comprises outwardly-inclined serrated spring-plates 87, rigidly attached to a skeleton frame or plate 88, connected with arms or bifurcated parts of a plate or lever 89 by screws 90, passing loosely through slots in said arms, so that the said frame or plate is free to adjust itself to inequalities in the work. The work to be clamped overlies the raised throat-plate 82, and the inclined serrated plates 87 are arranged to register with or fit closely against the slightly-rounded or outwardly-sloping sides of the said throat-plate, so that as the said serrated clamping-plates are lowered upon the work in clamping the material will be stretched tightly over the raised throat-plate and will thus be under some lateral tension, so that the buttonholes may be easily stitched and cut.

The clamping plate or lever 89 is hinged by a pin 91 to a block 92, attached to a plate 93, rigidly secured to the clamp base-plate or slide 75. The plate or lever 89 is pressed downward to clamp the work by a coil-spring 94, bearing on a collar 95, which in turn rests on a pin 96, lying on the said plate or lever 89. The stress of the spring 94 may be regulated by the adjustable thumb-nut 97 on the threaded upper end of a post 98, encircled by said spring and collar and rigidly fixed to the plate 93. The post 98 extends below the work-plate 2, and its lower part is formed hollow for the reception of a vertically-movable rod 99, provided near its upper end with a transverse pin 100, arranged to engage the under side of the hinged clamping plate or lever 89 for the purpose of lifting the said plate or lever to unclamp or release the work.

The machine herein shown is provided with a stop-motion device which is in principle like that shown and described in United States Patent No. 673,353, granted April 30, 1901, and comprising a clutch-controlling lever 101, carrying a spring-pressed plunger 102, having a portion or finger 113 coöperating with a disk or collar 103, fixed to the driving-shaft 4 of the machine, and with a loose disk 104, which is movable endwise of said shaft, so as to afford a friction-clutch connection between the driving-pulley 105, loose relative to said shaft, and a fixed collar on the end of the shaft between which and the said disk 104 said pulley is mounted. The disk 104 is mounted between the pulley 105 and the disk 103, fixed to said shaft, said disk 103 having a cam portion 106, a notch 107, and a projection 108, all as set forth in said patent. In the present construction the plunger 102 is provided with a hook 109 at its lower end, and the clutch-controlling lever 101 has a rigid upwardly-extending arm 110 and is provided below its fulcrum with a second or forwardly-extending arm 111, to the inward or forward end of which is connected a treadle-operated rod 112, which may be depressed to move the upper end of the clutch-controlling lever inward to disengage the finger 113 from the disks 103 104 when the loose pulley 105 is to be coupled to the driving-shaft 4 to start the machine running, and while the machine is in operation the said clutch-controlling lever is retained in the position shown in Fig. 1 by a latch-lever 114, the hooked rear end of which engages a pin 115 near the upper end of the arm 110.

Mounted in the stand or base 116, on which the machine rests, is a shaft 117, provided at its forward end with an arm or lifting-plate 118, which extends beneath the clamp-opening rod 99, said shaft having at its rear end an arm 119, carrying a spring-pressed latch or hook 120, arranged to be engaged by the oppositely-facing hook 109 on the plunger 102, under the control of the spring 121, which acts on said plunger to lift the same. The movement of the latch or hook 120 under the stress of its spring 122 is limited by a stop-pin 123, fixed to the arm 119 of the shaft 117.

The forward end of the latch-lever 114 overlies the ratchet-wheel 36 and is in the plane of movement of the barring-controlling plate 37, carried by said ratchet-wheel. Above said ratchet-wheel is a beveled collar 124, held in place by a screw 125, entering the upper end of the vertical post or stud 126, on which the said ratchet-wheel is mounted. The latch-lever is provided with a latch 127, pivoted on a horizontal pin 128 and acted on by a spring 129, serving to press the forward end of said latch downward toward the ratchet-wheel 36, the said latch being pressed toward the beveled collar 124 and screw 125 by a torsional spring 130, acting on the latch-lever 114 to press the hooked rear end thereof toward the pin 115 on the arm 110 of the clutch-controlling lever. When the machine is started at the commencement of the stitching of a buttonhole, the spring 129, acting on the latch-lever 114, presses the latch 127 toward the beveled collar 124 and screw 125, and in so doing the said beveled collar lifts the forward end of the said latch above the plane of movement of the controlling-plate 37, so that said latch will rest against the head of the said screw 125. In the operation of making the first bar of the buttonhole the forward end of the plate 37, coincidently with releasing the pawl 29 from engagement with the pin 28 on the bar 15, passes beneath the slightly-lifted latch 127 and comes into contact with the latch-lever 114 and moves said latch-lever far enough to partly withdraw it from engagement with the pin 115 and to enable the hook of said latch-lever to rest in a notch 131, with which said pin is provided. This movement of the said latch-lever withdraws the latch 127 from the beveled collar 24, and thus permits said latch to fall into contact with the ratchet-wheel, when the plate 37 is moved away from the latch-lever at the return movement of the said ratchet-wheel by its retracting-spring, as has been described, and as the said latch-lever is prevented from resuming its former position by reason of the engagement of its hook in the notch of the pin 115 the said latch will remain in the plane of the path of movement of the plate 37, so that when said plate is again moved forward with the ratchet-wheel at the second or final barring operation for a buttonhole said plate will engage said latch and give an additional movement to the said latch-lever, so as to fully disengage it from the pin 115. This additional movement of said latch-lever is due to the width of that portion of the latch now interposed between the plate 37 and said latch-lever and which width is about equal to or slightly in excess of the depth of the notch 131 in the pin 115. This tripping of the retaining device for the clutch-controlling lever 101 enables the spring 132 to move said clutch-controlling lever to its unclutching position, (shown in Figs. 10 and 11,) thus bringing the hook 109 at the lower end of the plunger 102 into register with the hook 120, and when in the unclutching operation the said plunger is depressed by the cam portion 106 of the disk 103 the said hooks will be engaged with each other, so that when in the continued rotation of the said disk the finger 113 snaps into the notch 107 of said disk as said plunger is lifted by its spring 121 the shaft 117 will be rocked, causing its forward arm or lifting-plate 118 to raise the rod 99, thereby lifting the spring-pressed clamping plate or lever 89 to open the clamp and release the work. I do not, however, claim in this application the feature hereinbefore described of controlling or setting the stop-motion mechanism into action by the barring mechanism of a buttonhole-stitching machine, this feature being reserved to my application, Serial No. 165,791, filed July 16, 1903, and which is a division of this application.

Arranged above the clamping plate or lever 89 is an arm 133 of a small rock-shaft 134, having a second arm 135, the wedge-shaped upper end of which is so arranged as to be normally adjacent to the disks 136 of the needle-thread-tension device, so that when the said plate or lever 89 is lifted, as described, the upper end of said arm 135 will force the said disks apart, and thus release the tension on the needle-thread.

The buttonhole-cutter 137 is carried by a block 138, secured to the lower end of the cutter-bar 139, mounted in vertical bearings in the forward part of the arm 3, said bar being connected by a link 140 with the forward end of a cutter-operating lever 141, pivoted on a fixed block or bracket 144 and having at its rear end a pin or roller-stud entering a cam-groove 142 of a cylinder 143, loosely mounted on the shaft 33, to which the feed-wheel 60 is secured. Fixed to the shaft 33 is a collar 145, to which is connected one end of a torsional spring 146, the other end of which is connected to a second collar 147, loose on the shaft 33 and having a yielding connection with the cam-cylinder 143 through a buffer-spring 148, housed in a recess in said cam-cylinder and engaged at one end by a lug 84 on said collar 147. (See Figs. 26 and 27.) The spring 148, one end of which is engaged by the lug 84 on a collar 147 and the other end of which abuts against the end wall of the recess in said cam-cylinder 143, in which said spring is housed, serves as a yielding or cushioning connection between said cam-cylinder and collar, so that when the rotation of said collar is suddenly arrested by impact of the tappet 158 on said collar against the lug 153 of the escapement-lever 149 the said spring will act as a buffer to soften or cushion the shock of the sudden stoppage of the rotation of the heavy cam-cylinder. Pivoted to the arm 3 is an escapement-lever 149, normally pressed upward by a spring 150 against a stop-block 151 or a cushion or buffer thereon, said escapement-lever having at its free or forward end two teeth 152 and 153. Secured to the shaft 33 is a collar 154, having a notch or opening 155 and a cam-flange 156, arranged to ride over the upper tooth 152 of the said escapement-lever to depress the latter into the plane of movement of a stop on the cam-cylinder 143, afforded by the rear wall 157 of a notch formed in the upper end of said cylinder. The lower tooth 153 is arranged for coöperation with a radial lug 158, with which the collar 147 is provided. During the stitching of a buttonhole the rotation of the shaft 33, connected with the feed-wheel 60, winds up or puts under tension the torsional spring 146 by reason of the fact that one end of said spring is connected to the collar 145, rotating with said shaft, while the other end of said spring is connected with the normally stationary collar 147, connected with the loose cam-cylinder 143. When the machine is stopped at the completion of a buttonhole, the upper tooth 152 of the escapement-lever is in the notch or opening 155 of the collar 154 and which notch or opening affords such a clearance for the said tooth as to enable the said escapement-lever to be lifted high enough to bring the lower tooth 153 of said lever into the path of movement of the radial lug 158 of the collar 147, the striking contact of said lug 158 with said tooth 153 when the cam-cylinder 143 performs its rotary movement to cut a buttonhole being cushioned by the yielding connection of the collar 145 with said cam-cylinder afforded by the buffer-spring 148. When the machine is started, the cam-flange 156 of the collar 154, slowly rotating with the feed-wheel, gradually depresses the upper tooth 152 of the escapement-lever until the lower tooth 153 of said lever is disengaged from the radial lug 158 of the collar 147, and at this time the said upper tooth 152 is depressed, so as to be in the path of movement of the stop-wall 157 on the cam-cylinder afforded by the notch in the upper end of said cylinder. As soon as the lug 158 is released from the tooth 153 said lug passes by said tooth by virtue of the stress of the torsional spring 146; but the further rotation of the cam-cylinder at this time and of the collar 147, connected therewith, is arrested by the engagement of the wall 157 with the tooth 152. During this slight rotary movement of the cam-cylinder no movement is imparted to the cutter-lever, as the portion of the cam-groove in said cylinder passing the roller-stud on said lever at this time is a straight or inactive one. The continued rotation of the shaft 33 with the feed-wheel brings the notch or opening 155 on the collar 154, fixed to said shaft, into register with the tooth 152 by or about the time the stitching of the last side of the buttonhole is completed, and as soon as said notch is in register with said tooth the spring 150 lifts the escapement-lever 149, and thereby disengages said tooth 152 from the stop-wall 157 of the cam-cylinder 143, thus leaving said cylinder free to be rotated by the stress of the torsional spring 146. The movement of the collar 147 is communicated to said cam-cylinder 143 through the lug 84, which abuts against one end of the recess or pocket in the said cam-cylinder, in which the spring 148 is housed between said lug and the other end wall of said recess or pocket. This rotation of said cam-cylinder operates the cutter-lever 141 to cut the buttonhole in stitching position and then again lift the cutter; but before the said cylinder has quite completed its rotation the lug 158 on the collar 147, yieldingly connected with said cam-cylinder, comes into contact with the lower tooth 153 of the escapement-lever and arrests the further rotary movement of said cylinder until said tooth is again disengaged from said lug, as heretofore described. Thus sudden stopping of the rotation of the said cam-cylinder is cushioned by the buffer-spring 148, as has already been explained.

In the machine to which the present invention is shown as being applied the stitch-forming mechanism comprises an oscillating shuttle 159, coöperating with the vertically and horizontally movable needle 8, said shuttle being operated from the rock-shaft 160, as in the well-known Singer oscillating-shuttle machines. The present machine is therefore adapted to form a two-thread lock-stitch buttonhole or overedge seam, and in making such a seam the position of the purl on the upper side of the work is determined by the tension on the lower or shuttle thread and against which the take-up 161 pulls in tightening the stitches. When a stitch has been "set" and the purl has been drawn to its proper position, it is desirable that the said purl should not be disturbed, as it is liable to be when slack shuttle-thread is drawn from the bobbin through the lower tension for the next succeeding stitch, and to prevent such disturbance of the purl the present invention provides an automatic thread-nipping device or thread-check, which holds the lower or shuttle thread immovable between the bobbin or thread-supply and the work during the reverse movement of the shuttle or during the time after a stitch has been tightened by the take-up when slack is being drawn from the lower thread-supply for the next succeeding stitch.

In the present construction the bobbin 162 is provided with an upwardly-extending finger or projection 59, which by engagement with a portion 163 of the shuttle-race or other relatively stationary part restrains the bobbin from rotation as the shuttle oscillates about it. This finger or projection 59 has a yielding portion 164, which normally springs away from said finger or projection, so that the thread may draw freely between these two parts, but is prevented from escaping from between them by a small cross-pin 165. The shuttle 159 is provided on its front or outer face with the usual inclined flange 166, against which the lower thread snugly lies when a stitch has been tightened by the take-up and which flange during the reverse movement of the shuttle draws slack thread through the lower or shuttle tension for the next stitch. The shuttle-operating rock-shaft 160 is provided with an eccentric 167, embraced by a yoke or portion of a lever 168, carrying a yieldingly-mounted or spring-pressed plunger 169, which at the reverse movement of the shuttle impinges against the spring or yielding portion 164 of the finger 59, so that the lower thread is nipped between these two parts with a grip sufficiently firm to prevent any downward pull thereon from the work while the pull-off flange 166 is drawing slack thread through the lower or shuttle tension for the next stitch. It will thus be understood that with this thread-nipping device for the lower or shuttle thread the purl when once drawn to its proper position at or along the edge of a buttonhole-seam will remain undisturbed by any subsequent pull on the thread when slack for the next stitch is drawn from the lower-thread supply. This feature may be used with any plural-thread buttonhole or other overseaming or irregular stitch forming mechanism when it is desired to prevent disturbance of the lock or purl after the stitches have once been set or fully tightened. This nipping device for the lower thread is also advantageous in that owing to the fact that the shuttle-flange pull-off draws only a limited amount of thread suitable for the overseaming-stitches through the lower tension, so that when the longer barring-stitches are being formed the interlocking purl will be drawn to the lower side of the work, out of sight, leaving the bar smooth and plain on the face of the work, so as to have the appearance of a hand-made bar.

In the operation of the machine the attendant first locates the work in the clamp and then by a slight downward movement of the treadle-operated rod 112 the clutch-controlling lever 101 is moved far enough to disengage the hook 109, movable therewith, from the hook or latch 120 of the clamp-opening shaft 117, so that the spring 94 will close the clamp. If the work should not be properly located in the clamp, the attendant can release the work by lifting the spring-pressed clamping plate or lever 89 to readjust the work. After the work is clamped, as above described, a further downward movement of the treadle-rod 112, acting through the arm 111 of the clutch-controlling lever 101, moves the finger 113 at the upper end of the said lever inward away from the disks 103 104, thereby releasing the stop-motion device and starting the machine. The buttonhole will now be automatically stitched, barred, and cut by the mechanism, the construction and operation of which has already been described in detail, and at the completion of the last bar the latch-lever 114 is automatically disengaged from the pin 115, near the upper end of the arm 110 of the clutch-controlling lever 101, leaving said lever free to be moved by its spring 132 into stopping position, and so that as the machine is stopped the hooks 109 and 120 will be engaged, and the spring 121 will then lift the hook or latch 120, and thus rock the shaft 117, the plate or arm 118 at the forward end of which will raise the rod 99 and open the clamp. As the clamping arm or plate 89 is raised it engages the arm 133 of the tension-release shaft, causing the arm 135 of said shaft to enter between the tension-disks 133 and release the tension on the needle-thread, leaving the work free to be shifted for the next buttonhole.

In the operation of the cutting mechanism, as hereinbefore described, the rotation of the cutter-operating cylinder 143, under the stress of its operating-spring 146, is arrested when the said cam-cylinder has fully completed a rotation by the engagement of the wall 157 afforded by the notch in the upper end of said cam-cylinder with the upper tooth 152 of the escapement-lever 149, and at this time the said cutter-operating cam-cylinder is locked, so as to be positively restrained from further rotary movement until the notch or opening 155 in the cam-flange 156 of the collar 154 (the said collar rotating with the shaft 33) again comes into register with the said tooth 152, and thereby permits the spring 150 to lift the escapement-lever, so as to remove the said tooth 152 from the said stop-wall 157 on the said cam-cylinder. It will thus be understood that any accidental movement of the cutter excepting at such predetermined times as it should be operated to cut the buttonholes is securely provided against, so that only a single reciprocation of the said cutter can occur during the entire working, including barring, of a buttonhole.

The present invention is not to be understood as being limited to the details of construction herein shown and described, as these may be varied widely without departing from the essence of the invention as expressed in the claims hereunto appended.

Having thus described my invention, I claim and desire to secure by Letters Patent—

1. In a buttonhole-stitching machine, the combination with a stitch-forming mechanism, a work-clamp and a feeding mechanism comprising a rotating feeding device for spacing the overseaming-stitches, of a barring mechanism independent of said work-clamp and feeding mechanism, and automatic means for suspending the movements of said rotating feeding device during the barring operation.

2. In a buttonhole-stitching machine, the combination with a stitch-forming mechanism, a work-clamp and a feeding mechanism for spacing the overseaming or covering stitches and comprising a rotating feed-wheel, of a barring mechanism independent of said work-clamp and feeding mechanism, and automatic means for suspending the rotation of the said feed-wheel during the barring operations.

3. In a buttonhole-stitching machine, the combination with a stitch-forming mechanism, a work-clamp, a feeding mechanism for spacing the overseaming or edge-covering stitches, and means for shifting said work-clamp laterally for stitching the opposite sides of the buttonholes, of a barring mechanism independent of said feeding mechanism, and adjustable controlling means whereby the number of stitches for a bar may be varied without varying the feeding movement of the work-clamp.

4. In a buttonhole-stitching machine, the combination with a stitch-forming mechanism, a work-clamp, a feeding mechanism for spacing the overseaming or edge-covering stitches, and means for shifting said work-clamp laterally for stitching the opposite sides of the buttonholes, of a barring mechanism independent of said work-clamp and feeding mechanism, and adjustable controlling means whereby the number of stitches for a bar may be varied without special movements of the work-clamp and without varying the effective speed of the feed.

5. In a buttonhole-stitching machine, the combination with a work-clamp, a feeding mechanism for spacing the overseaming or edge-covering stitches, and means for shifting said work-clamp laterally for stitching the opposite sides of the buttonholes, of a stitch-forming mechanism comprising a horizontally-movable needle-bar and needle, means for adjusting the horizontal throw of the said needle-bar and needle, and a barring mechanism comprising means for automatically increasing the horizontal throw of the needle-bar and needle during the barring operations and which barring mechanism is of such construction that whatever may be the normal horizontal throw of the needle-bar and needle for the overseaming-stitches the horizontal throw of the said needle-bar and needle for the barring-stitches will be proportionately larger.

6. In a buttonhole-stitching machine, the combination with a stitch-forming mechanism, a work-clamp, a feeding mechanism for spacing the overseaming-stitches, and means for shifting the work-clamp laterally for stitching the opposite sides of the buttonholes, of a tension device for the needle-thread, means for automatically opening said work-clamp when a buttonhole has been completed, and a tension-releasing device automatically operated from said work-clamp so that when said clamp is opened the tension on the needle-thread will be released.

7. In a buttonhole-stitching machine, the combination with a stitch-forming mechanism and a feeding mechanism for spacing the overseaming-stitches, of a buttonhole-cutter, a throat-plate having a raised longitudinal portion with inclined or outwardly-sloping sides and having also a transverse needle-slot and a longitudinal slot in which said cutter closely fits and which cutter-slot opens into said needle-slot, and a work-clamp comprising inclined longitudinal plates registering with said outwardly-sloping sides of said throat-plate to draw the work tightly over the latter to facilitate cutting.

8. In a buttonhole-stitching machine, the combination with upper and lower thread-carrying overseaming-stitch-forming devices comprising a work-clamp and means for changing the relative lateral positions between the needle and the work to make the overseaming-stitches, means for feeding said clamp to space the buttonhole-stitches, tension devices for the upper and lower threads, and a take-up for drawing up the upper thread in tightening the stitches, of an automatic pull-off device for the lower thread, and an automatic thread-nipping device timed to engage and hold the lower thread after a stitch has been "set" or tightened and while the said pull-off device is drawing thread through the lower tension device for the next stitch; whereby, after the purl has been drawn to its proper place along the edge of a buttonhole, it will remain undisturbed by any subsequent strain or draft on the lower thread.

9. In a buttonhole-stitching machine, the combination with upper and lower overseaming-stitch-forming devices, and means for holding and feeding the work, of a take-up device for the upper thread, a lower thread-pull-off device to draw sufficient slack thread for the overseaming-stitches, an automatic thread-nipping device which is timed to engage the lower thread and hold the same immovable after a stitch has been set by the take-up and while the said pull-off is drawing slack thread for the next stitch, and a barring mechanism by which the length of the stitches is increased for the barring operation and during the operation of which barring mechanism, owing to the coaction of the said thread-nipping device, the purl or lock of the threads is drawn down to the under side of the work.

10. In a buttonhole-stitching machine, the combination with a work-clamp, a feeding mechanism for spacing the overseaming-stitches, and means for shifting said work-clamp laterally for stitching the opposite sides of the buttonholes, of a stitch-forming mechanism comprising a needle and a coöperating loop-taking device, means for producing a relative lateral movement between the needle and work for forming overseaming-stitches, adjusting means for increasing or diminishing the relative lateral movement between the needle and the work, to vary the width of the overseam, and a barring mechanism forming longer stitches than the width of the overseam and which barring mechanism comprises automatic means for proportionally increasing or diminishing the relative lateral movement between the needle and the work when the width of the overseam is changed; so that when the overseam is made wider or narrower the barring-stitches will automatically be made proportionally longer or shorter.

11. In a buttonhole-stitching machine, the combination with a stitch-forming mechanism, a work-clamp and a feeding mechanism comprising or including a rotating feed-wheel, for spacing the overseaming or edge-covering stitches, of a barring mechanism, and means for automatically suspending the rotary movements of said feed-wheel during the barring operations.

12. In a buttonhole-stitching machine, the combination with a stitch-forming mechanism, a work-clamp and a feeding mechanism for spacing the overseaming or edge-covering stitches, of a barring mechanism, and means, controlled by said barring mechanism, for automatically suspending the operation of said feeding mechanism during the barring operations.

13. In a buttonhole-stitching machine, the combination with a stitch-forming mechanism, of a work-clamp and a feeding mechanism for spacing the overseaming or edge-covering stitches, of a barring mechanism; means, controlled by said barring mechanism, for automatically suspending the operation of said feeding mechanism during the barring operations, and restoring means, also controlled by said barring mechanism, for automatically starting the feeding devices when a barring operation has been completed.

14. In a buttonhole-stitching machine, the combination with a stitch-forming mechanism, a work-clamp and a feeding mechanism for spacing the overseaming-stitches, of an automatic buttonhole-cutting mechanism comprising or including a rotating operating-cam, means for rotating said cam to operate the cutter, means for preventing said cam from performing quite a complete rotation when the cutter is operated to cut a buttonhole, and tripping devices by means of which, during a buttonhole-stitching operation, said cam is released so that it completes its rotation.

15. In a buttonhole-stitching machine, the combination with a stitch-forming mechanism, a work-clamp and a feeding mechanism for spacing the overseaming-stitches, of an automatic buttonhole-cutting mechanism comprising or including a rotating operating-cam, means for rotating said cam to operate the cutter, and locking means for positively restraining said cam from moving except at a predetermined time at a buttonhole-working operation; whereby accidental movement of the cutter will be prevented so that only a single reciprocation of the cutter can occur during the working, including barring, of a buttonhole.

16. In a buttonhole-stitching machine, the combination with a stitch-forming mechanism, a work-clamp and a rotating feed cam or device connected with said work-clamp and serving to move the latter for spacing the overseaming or edge-covering stitches, of a barring mechanism comprising or including a reversible rotary controlling wheel or device which is movable independently of the said feed-cam and which controls the formation of barring-stitches, and means for imparting reverse rotary movements to said wheel or device.

17. In a buttonhole-stitching machine, the combination with a stitch-forming mechanism, a work-clamp and a rotating feed cam or device connected with said work-clamp and serving to move the latter for spacing the overseaming or edge-covering stitches, of a barring mechanism comprising or including a reversible rotary controlling wheel or device which is movable independently of the said feed-cam, means for imparting reverse rotary movements to said wheel or device, and adjustable controlling means whereby the extent of movements of the controlling wheel or device may be regulated so that any desired number of stitches for a bar may be formed.

18. In a buttonhole-stitching machine, the combination with a stitch-forming mechanism, a work-clamp and a rotating feed cam or device connected with said work-clamp and serving to move the latter for spacing the overseaming or edge-covering stitches, of a barring mechanism comprising or including a rotary wheel or device which is movable independently of the said feed-cam, and means for suspending the rotation of the said feed-cam during the times when the said barring mechanism is in operation.

19. In a buttonhole-stitching machine, the combination with a stitch-forming mechanism, a work-clamp and a feeding mechanism for spacing the overseaming stitches, of an automatic buttonhole-cutting mechanism comprising or including a yieldingly-driven or spring-actuated cutter-operating cam, and an escapement device for periodically releasing the said cam for actuating the cutter.

20. In a buttonhole-stitching machine, the combination with a stitch-forming mechanism, a work-clamp and a feeding mechanism for spacing the overseaming-stitches, of an automatic buttonhole-cutting mechanism comprising or including a yieldingly-driven or spring-actuated cutter-operating cam, an escapement device for periodically releasing the said cam for actuating the cutter, and locking means for positively restraining said cam from moving excepting at a predetermined time at the buttonhole-working operation; whereby any accidental movement of the cutter will be prevented so that only a single reciprocation of the cutter can occur during the working, including barring, of a buttonhole.

21. In a buttonhole-stitching machine, the combination with a stitch-forming mechanism and a feeding mechanism for spacing the overseaming-stitches, of a buttonhole-cutter, a throat-plate having a raised portion with inclined or outwardly-sloping sides, and a work-clamp comprising inclined flexible or elastic work-holding plates, as 87, registering with the said outwardly-sloping sides of the said throat-plate to draw the work over the latter as the work is clamped.

22. In a buttonhole-stitching machine, the combination with a stitch-forming mechanism comprising a horizontally-movable needle-bar, of a work-clamp, a rotating feed-wheel and coöperating devices for spacing the overseaming or edge-covering stitches, a cam rotating independently of said feed-wheel, a lever or rocker operated by said cam and having two pins or projections at different distances from its fulcrum or center of motion, a longitudinally-reciprocating bar through which horizontal movements are imparted to the needle-bar, and automatic means for operatively connecting said longitudinally-reciprocating bar with either of the said pins or projections, so that a lesser or greater horizontal throw may be imparted to the needle-bar according to whether overseaming or barring stitches are being formed.

23. In a buttonhole-stitching machine, the combination with a stitch-forming mechanism comprising a horizontally-movable needle-bar of a work-clamp, a rotating feed-wheel and coöperating devices for spacing the overseaming or edge-covering stitches, a cam rotating independently of said feed-wheel, a lever or rocker operated by said cam and having two pins or projections at different distances from its fulcrum or center of motion, a longitudinally-reciprocating bar through which horizontal movements are imparted to the needle-bar, automatic means for operatively connecting said longitudinally-reciprocating bar with either of the said pins or projections so that a lesser or greater horizontal throw may be imparted to the needle-bar according to whether overseaming or barring stitches are being formed, and an intermittingly-rotating controlling wheel or device provided with means for changing the longitudinally-reciprocating movements of the said bar from long to short movements when barring-stitches have been completed.

24. In a buttonhole-stitching machine, the combination with a stitch-forming mechanism and a work-clamp, of a rotating feed-wheel and coöperating devices for spacing the overseaming or edge-covering stitches, a cam rotating independently of said feed-wheel, a lever or rocker operated by said cam and having two pins or projections at different distances from its fulcrum or center of motion, a longitudinally-reciprocating bar through which horizontal movements are imparted to the needle-bar, automatic means for operatively connecting said longitudinally-reciprocating bar with either of the said pins or projections so that a lesser or greater horizontal throw may be imparted to the needle-bar according to whether overseaming or barring stitches are being formed, and an intermittingly-rotating controlling wheel or device provided with means for changing the longitudinally-reciprocating movements of the said bar from long to short movements when barring-stitches have been completed, said wheel being provided with an adjustable plate or device by changing the position of which the number of barring-stitches for each bar may be regulated or varied.

25. In a buttonhole-stitching machine, the combination with a stitch-forming mechanism comprising a horizontally-movable needle-bar, of a work-clamp, a feeding mechanism for spacing the overseaming or edge-covering stitches, a longitudinally-reciprocating bar, as 15, connected with the said needle-bar and through which horizontal movements are imparted to the latter, said bar 15 being provided with two notches having converging sides, a rotating cam, a lever or rocker, as $b$, operated by said cam and provided with two pins or projections at different distances from its fulcrum or center of motion for engagement with the said longitudinally-reciprocating bar 15 at the said notches, and automatic means for moving the said bar 15 laterally at intervals so that the horizontal movements of the needle-bar will be greater or lesser according to whether overseaming or barring stitches are to be formed.

26. In a buttonhole-stitching machine, the combination with a stitch-forming mechanism comprising a horizontally-movable needle-bar and needle, a work-clamp and a feeding mechanism for spacing the overseaming or edge-covering stitches, of the bar 15 provided with two converging notches 25 and 26 and a pin or projection 28, the lever or rocker $b$ having the pins or projections 23 and 24 at different distances from its fulcrum or center of motion, a rotating cam for operating said lever or rocker, the lever 30 provided with a pawl 29 for engagement with said pin or projection 28, means for operating said lever 30 to cause the said pawl to engage the said pin 28, at proper intervals, to move the said bar 15 laterally when barring-stitches are to be formed, and automatic means for disengaging said pawl from said pin 28 when the barring-stitches have been completed.

27. In a buttonhole-stitching machine, the combination with a stitch-forming mechanism comprising a horizontally-movable needle-bar and needle, a work-clamp and a feeding mechanism for spacing the overseaming or edge-covering stitches, of the bar 15 provided with two converging notches 25 and 26 and a pin or projection 28, the lever or rocker $b$ having the pins 23 and 24 at different distances from its fulcrum or center of motion, a rotating cam for operating said lever or rocker, the lever 30 provided with a pawl 29 for engagement with the said pin or projection 28, means for operating said lever 30 to cause the said pawl to engage the said pin 28 at proper intervals to move the said bar laterally when barring-stitches are to be formed, automatic means for disengaging said pawl from said pin 28 when the barring-stitches have been completed, said automatic means comprising the intermittingly-rotated spring-retracted ratchet-wheel 26, carrying a controlling-plate, and operating and detent pawls for said ratchet-wheel.

28. In a buttonhole-stitching machine, the combination with a stitch-forming mechanism, comprising a horizontally-movable needle-bar, a work-clamp and a feeding mechanism for spacing the overseaming or edge-covering stitches, of the bar 15 provided with two converging notches 25 and 26 and a pin or projection 28, the lever or rocker $b$ having the pins 23 and 24 at different distances from its fulcrum or center of motion, a rotating cam for operating said lever or rocker, the lever 30 provided with the pawl 29 for engagement with said pin or projection 28, means for operating said lever 30 to cause the said pawl to engage the said pin 28 at proper intervals, to move the said bar 15, laterally when barring-stitches are to be formed, and automatic means for disengaging said pawl from said pin 28 when the barring-stitches have been completed, said automatic means comprising the intermittingly-rotated spring-retracted ratchet-wheel 26 carrying a controlling-plate, said controlling-plate being adjustably mounted upon the said ratchet-wheel so that the number of barring-stitches to be formed may be varied or regulated, and operating and detent pawls for said ratchet-wheel.

29. In a buttonhole-stitching machine, the combination with a stitch-forming mechanism and a work-clamp, of a feeding mechanism for spacing the overseaming or edge-covering stitches and comprising an intermittingly-rotating feed-wheel, a two-part connecting-rod connected with the said feed-wheel, for operating the latter, and automatic means for disconnecting the two parts of said connecting-rod from each other when barring-stitches are to be formed, so as to suspend the operation of the said feed-wheel, during the barring operation.

30. In a buttonhole-stitching machine, the combination with a stitch-forming mechanism and a work-clamp, of a feeding mechanism for spacing the overseaming or edge-covering stitches and comprising a rotating feed-wheel, an operating mechanism for said feed-wheel comprising the two-part connecting-rod 51 and 52 and the lever 67 having a projection or portion for joining the two parts of said connecting-rod together, and a barring mechanism comprising the longitudinally-reciprocating and laterally-movable bar 15 arranged to engage the said lever 67 and move the same so as to cause the two parts of said connecting-rod to be disengaged when barring-stitches are to be formed, for the purpose of suspending the operation of the feed-wheel during the barring operation.

31. In a buttonhole-stitching machine, the combination with upper and lower overseaming-stitch-forming devices, a work-clamp and a feeding mechanism for spacing the overseaming or edge-covering stitches, the lower stitch-forming devices comprising a shuttle having a pull-off flange for the lower thread and a bobbin-case having an arm or projection which prevents the said bobbin-case from moving with the shuttle, and which arm or projection is constructed to form a thread-nipping device, a take-up device for tightening the stitches, and means for closing said thread-nipping device after a stitch has been tightened and while thread is being drawn from the bobbin for the next succeeding stitch; whereby after the purl has been drawn to its proper position at the edge of a buttonhole it will be undisturbed by any subsequent pull on the lower thread.

32. In a buttonhole-stitching machine, the combination with upper and lower overseaming-stitch-forming devices, a work-clamp and a feeding mechanism for spacing the overseaming or edge-covering stitches, the lower stitch-forming devices comprising a shuttle having a pull-off flange for the lower thread, and a bobbin-case having an arm which prevents the said bobbin-case from moving with the shuttle, and which arm is constructed to form a thread-nipping device, a take-up device for tightening the stitches, a spring-pressed plunger, as 169, for closing the said thread-nipping device, a vibrating arm or lever, as 168, by which said spring-pressed plunger is carried, and means for operating the said arm or lever 168.

33. In a buttonhole-stitching machine, the combination with a stitch-forming mechanism, a work-clamp and a feeding mechanism for spacing the overseaming-stitches, of a stop and start motion clutch device, a shaft 117 provided with the arm or plate 118, a clamp-opening rod 99 adapted to be engaged and lifted by said arm or plate, the arm 119 on said shaft 117, a hook or pawl connected with said arm 119 and a hook connected with the stop-motion-clutch-controlling lever; whereby when the machine is stopped the said work-clamp will be automatically opened, and whereby also when the said stop-motion-clutch-controlling lever is moved to a position to start the machine the said hooks will be disengaged so that the said clamp may be automatically closed.

34. In a buttonhole-stitching machine, the combination with stitch-forming and feeding mechanisms and a work-clamp, of an automatic buttonhole-cutting mechanism comprising the cutter-operating cam-cylinder 143 provided with a notch one wall of which forms a stop or shoulder 157, a shaft 33 on which the said cylinder is loosely mounted, a spring 146 connecting said shaft with said cam wheel or cylinder, means for winding up or compressing said spring during the operation of stitching a buttonhole, a collar 154 attached to and rotating with said shaft and provided with an opening 155 and a cam-flange 156, and an escapement device comprising the lever 149 having the tooth 152, and a spring for lifting said lever after it has been depressed by said cam-flange when the said tooth 152 comes into register with the said notch or opening 155.

35. In a buttonhole-stitching machine, the combination with stitch-forming and feeding mechanisms and a work-clamp, of an automatic buttonhole-cutting mechanism comprising the cutter-operating cam-cylinder 143 provided with a notch one wall of which forms a stop or shoulder 157, a shaft 33 on which the said cylinder is loosely mounted, a spring 146 connecting said shaft with said cam-cylinder, means for winding up or compressing said spring during the operation of stitching a buttonhole, a collar 154 attached to and rotating with said shaft and provided with an opening 155 and a cam-flange 156, an escapement device comprising the lever 149 having the teeth 152 and 153, a spring for lifting said lever after it has been depressed by said cam-flange when the said tooth 152 comes into register with the said notch or opening 155, a second collar 147 loosely mounted on said shaft 33 and to which one end of said spring 146 is connected, said collar 147 having a radial lug 158 coöperating with said tooth 153, and a yielding or cushioning connection, as spring 148, between said collar 147 and said cam-cylinder 143.

36. In a buttonhole-stitching machine, the combination with a two-thread, lock-stitch overseaming mechanism comprising a work-clamp and means for changing the relative lateral positions between the needle and the work to make the overseaming-stitches, means for feeding said clamp to space the buttonhole-stitches, tension devices for the upper and lower threads, and a take-up for drawing up the upper thread in tightening the stitches, of an automatic pull-off device for the lower thread, and an automatic thread-nipping device timed to engage and hold the lower thread after a stitch has been "set" or tightened and while the said pull-off device is drawing thread through the lower tension for the next stitch; whereby, after the purl has been drawn to its proper place along the edge of a buttonhole, it will remain undisturbed by any subsequent strain or draft on the lower thread.

37. In a buttonhole-stitching machine, the combination with an overseaming-stitch-forming mechanism, a work-clamp, a feeding mechanism for spacing the overseaming or covering stitches, and means for actuating such feeding mechanism, of a barring mechanism, and automatic means for disconnecting the feeding mechanism from its actuating means in order to suspend the operation of the said feeding mechanism during the barring operations.

In testimony whereof I affix my signature in presence of two witnesses.

EDWARD B. ALLEN.

Witnesses:
 HENRY J. MILLER,
 ALEX. BOYD.